(12) United States Patent
Kirk et al.

(10) Patent No.: US 7,305,014 B2
(45) Date of Patent: Dec. 4, 2007

(54) SYNCHRONOUS SYSTEM BUS

(76) Inventors: David Kirk, 5587 Pettapiece Cres, Manotick, Ontario (CA) K4M 1C5; Erik Trounce, 24C Castlebrook Lane, Nepean, Ontario (CA) K2G 5G2; Matthew Coakeley, 34 Heritage Grove Cresent, Stittsville, Ontario (CA) K2S 1R2; Nizar Rida, 13 Cedarhill Drive, Ottawa, Ontario (CA) K2R 1B9; Ingrid Zorgdrager, 52 Macassa Circle, Kanata, Ontario (CA) K2T 1J8

(*) Notice: Subject to any disclaimer, the term of this patent is extended or adjusted under 35 U.S.C. 154(b) by 988 days.

(21) Appl. No.: 10/421,018

(22) Filed: Apr. 22, 2003

(65) Prior Publication Data

US 2004/0213282 A1    Oct. 28, 2004

(51) Int. Cl.
*H04J 3/02* (2006.01)
(52) U.S. Cl. .................................. 370/539; 370/541
(58) Field of Classification Search ............. 370/535, 370/538, 539, 540, 541, 503, 509, 510, 512, 370/513, 514
See application file for complete search history.

(56) References Cited

U.S. PATENT DOCUMENTS

| | | | | |
|---|---|---|---|---|
| 5,210,762 A * | 5/1993 | Weeber et al. | ............. | 714/822 |
| 5,257,261 A * | 10/1993 | Parruck et al. | ............. | 370/522 |
| 5,351,236 A * | 9/1994 | Pawelski | ............. | 370/358 |
| 5,579,323 A * | 11/1996 | Krisher | ............. | 370/476 |
| 5,740,157 A * | 4/1998 | Demiray et al. | ............. | 370/219 |
| 5,754,545 A * | 5/1998 | Shinbashi et al. | ............. | 370/360 |
| 5,784,377 A * | 7/1998 | Baydar et al. | ............. | 370/463 |
| 6,157,658 A * | 12/2000 | Toyoyama et al. | ............. | 370/505 |
| 6,798,744 B1 * | 9/2004 | Loewen et al. | ............. | 370/235 |
| 6,807,186 B2 * | 10/2004 | Dally et al. | ............. | 370/413 |
| 7,190,666 B1 * | 3/2007 | Collins et al. | ............. | 370/216 |
| 2003/0161355 A1 * | 8/2003 | Falcomato et al. | ............. | 370/539 |

* cited by examiner

*Primary Examiner*—Ajit Patel
(74) *Attorney, Agent, or Firm*—Nixon Peabody LLP

(57) ABSTRACT

A flexible and expandable system bus for connecting traffic mapping devices to SONET/SDH framing devices. The system bus passes control signals generated by a master device to multiple tributaries to orient them relative to a SONET/SDH frame. These control signals obviate the need for each tributary to perform its own SONET/SDH reconstruction and framing using the A1/A2 bytes. The control signals synchronize the tributaries to a common clock cycle, indicate during which clock cycles the tributary can add or drop data relative to the system bus, and an interface identification signal that transmits values on the system bus. The tributaries monitor the values on the system bus, and when the value associated with each tributary appears on the bus, and the system bus indicates that the current clock cycle is within the SPE portion of the SONET/SDH frame, the tributary adds or drops data relative to the system bus.

82 Claims, 10 Drawing Sheets

|      |   |   |   |   |   |   |   |   |   |   |   |    |
|------|---|---|---|---|---|---|---|---|---|---|---|----|
| LANE | 0 | 1 | 2 | 3 | 4 | 5 | 6 | 7 | 8 | 9 | 10 | 11 |
| 3    | 1 | 4 | 7 | 10| 2 | 5 | 8 | 11| 3 | 6 | 9  | 12 |
| 2    | 13| 16| 19| 22| 14| 17| 20| 23| 15| 18| 21 | 24 |
| 1    | 25| 28| 31| 34| 26| 29| 32| 35| 27| 30| 33 | 36 |
| 0    | 37| 40| 43| 46| 38| 41| 44| 47| 39| 42| 45 | 48 |

TIMESLOT

*Fig. 7*

SYNCHRONOUS SYSTEM BUS

FIELD OF THE INVENTION

This invention relates generally to busses, and more particularly to a synchronous system bus for mapping and de-mapping data signals formatted according to varying protocols into at least one timeslot.

BACKGROUND OF THE INVENTION

Data can be communicated over electrical wires or optical fibers in a communications network. The electrical or fiber data may be formatted and defined according to any number of varying protocols and varying standards, depending on the application in which the data is used. In addition, these protocols and standards require different transmission rates, and the data may be synchronous, plesiosynchronous, or asynchronous. Organizing all of these so-called tributaries of data into a single data stream for transmission over an optical fiber requires mapping (or de-mapping) these tributaries into a frame of a well-known hierarchy called the synchronous optical network (SONET), the standard for such communications in North America, or synchronous digital hierarchy (SDH), SONET's European counterpart.

The basic building block of a SONET frame is a synchronous transport signal, level 1 (STS-1), which has a transmission rate of 51.84 Mbps. Higher transmission rates are supported by combining (or concatenating) multiple STS-1 signals together. Transmission rates below the STS-1 level are also supported. The synchronous payload envelope (SPE) of an STS-1 is subdivided into virtual tributaries (VT). The smallest VT, VT1.5, has a transmission rate of 1.728 Mbps. Higher bandwidth VTs are defined and include VT2, VT3, and VT6. Like the STS-1 signals, VT signals can be concatenated together to support different transmission rates. Using these basic building blocks of STS-1 and VT1.5, a variety of different data signals can be communicated over an optical fiber.

Mapping and de-mapping these data signals between an optical fiber line and client interfaces are typically carried out using a framer/mapper device. The device extracts information in the SONET frame to locate the data carried within the frame, typically by finding two bytes called the A1 and A2 bytes in the SONET frame, which indicate the start of the SONET frame. This device terminates SONET transport overhead with respect to client interfaces, and it converts the client interface signals between their respective protocol formats and SONET/SDH format. A tributary connected to the device also receives all of the data in the SONET frame, and the tributary must perform its own SONET framing and mapping to map and de-map its data relative to the SONET frame. These redundant functions performed by the tributary increase hardware and software complexity. The tributary must also know the bandwidth of the data communicated between it and the framer/mapper device.

Moreover, there is no centralized assignment of payload data relative to the various tributaries, raising the possibility of contention and security issues. For example, because each tributary is unaware of what other tributaries are adding to and dropping from the bus, multiple tributaries may attempt to map payload data into the same portion of the SONET frame. These issues can be partly addressed, but at a cost of increasing hardware and software complexity.

What is needed, therefore, is a flexible and expandable system bus for facilitating the mapping and de-mapping of varying communications protocols relative to a SONET/SDH frame. The present invention addresses this and other needs.

SUMMARY OF THE INVENTION

A synchronous system bus for communicating signals formatted according to different protocols includes a clock signal defining at least one timeslot, an interface address signal carrying with each timeslot a value corresponding to a tributary, a data signal adapted to carry payload data synchronized with the clock signal, and a payload marker signal indicating during which clock cycles payload data can be added to or dropped from the data signal. The system bus may include other signals, including an interface information signal carrying with each timeslot a value corresponding to a sub-tributary or port of the corresponding tributary value in the interface address signal, and a synchronization signal pulsing at least once to synchronize tributaries connected to the system bus to a first timeslot. In an embodiment, the payload data corresponds to at least the payload capacity portion of an SPE portion of a SONET/SDH frame.

The system bus may include a drop bus for broadcasting data to the tributaries and an add bus for transmitting data received from the tributaries. Some of the signals identified above are duplicated for the drop and add busses.

According to a method of communicating across a system bus, the method includes defining at least one timeslot with a clock signal on a system bus, assigning the timeslot to a value corresponding to a tributary, carrying payload data associated with the tributary over the system bus in synchronization with the clock signal, and signaling during which clock cycles of the clock signal payload data can be added or dropped from the data signal.

According to another method of communicating high-order and low-order signals over a system bus synchronized to clock cycles of a clock, the method includes synchronizing a plurality of tributaries to a first timeslot and transmitting on the system bus values each corresponding to unique ones of the tributaries in a predetermined order, one at a time, to each of the tributaries. The method further includes signaling during which of the clock cycles data can be communicated over the system bus and communicating during at least one clock cycle data between the system bus and the tributary corresponding to the value provided on the system bus during the at least one clock cycle.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

FIG. 6-1 is a functional block diagram of a master device according to a specific embodiment of the present invention;

FIG. 7 is a table illustrating an assignment of timeslots to STS-1 blocks according to a specific embodiment of the present invention;

Figure 1:
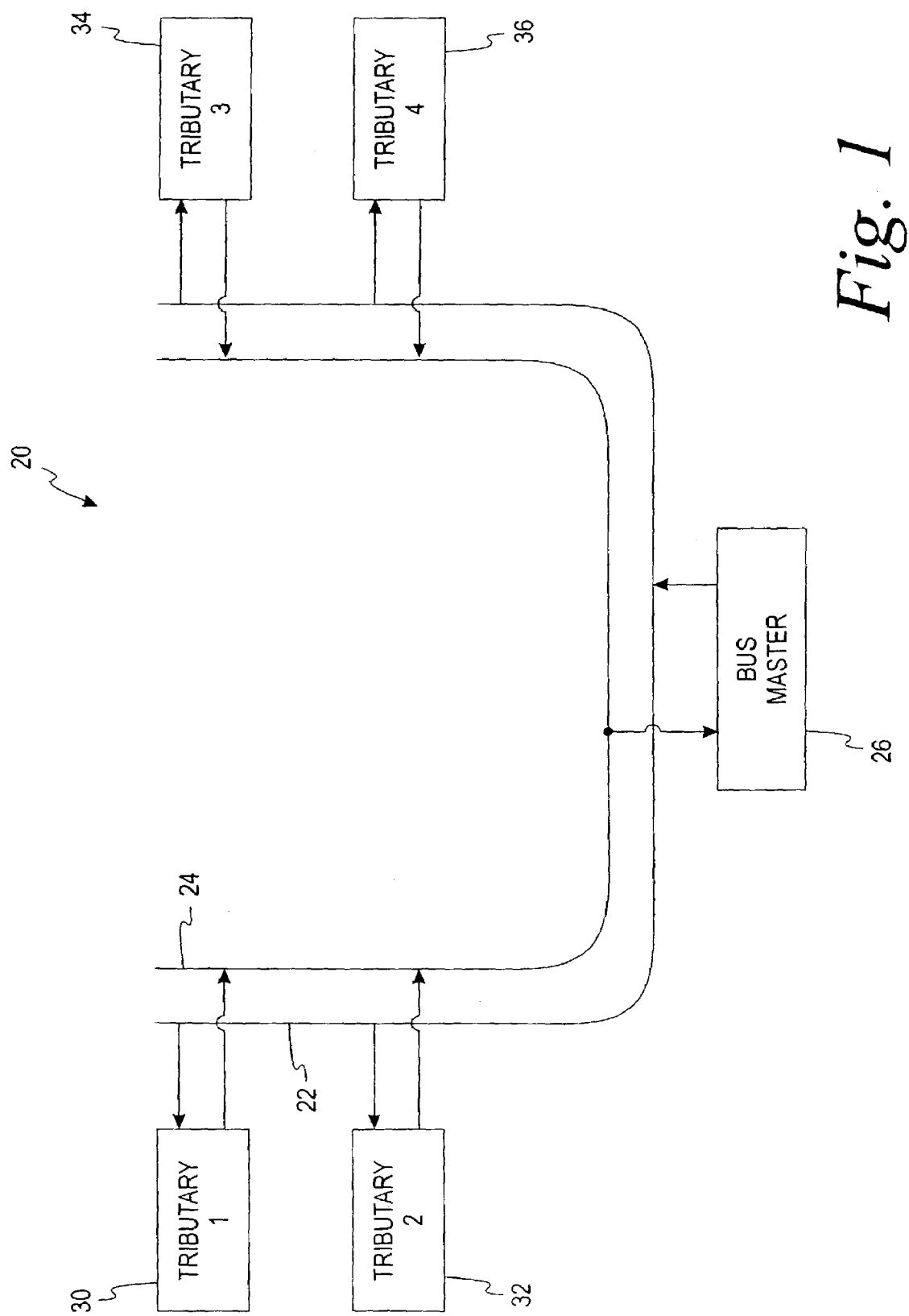
FIG. 1 is a functional block diagram of a system bus according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, and initially to FIG. 1, a functional block diagram is shown of a system bus 20 connected to a master device 26 and four tributary or mapper devices 30, 32, 34, 36. The system bus 20 generally facilitates communication of data between the tributary devices 30, 32, 34, 36 and the master device 26. The system bus 20 includes a drop (downstream) bus 22 and an add (upstream) bus 24. In addition to data signals, the system bus 20 also includes control signals and other signals which are described in more detail below. These signals generally indicate to each tributary 30, 32, 34, 36 when it can add or drop data relative to the system bus 20, freeing these tributary devices from having to perform full framing of the standard protocol. As explained below, the tributary devices monitor the system bus for an address value assigned to each particular tributary device, and when the tributary device sees its value on the system bus, it adds or drops payload data relative to the system bus during the allotted timeslot(s). Although four tributary devices 30, 32, 34, 36 are shown, fewer or more tributary devices may be connected to the system bus 20 in other embodiments. Each tributary device includes one or more sub-tributaries or ports and an interface for mapping/de-mapping data relative to the system bus. When the tributary devices 30, 32, 34, 36 are adding data to the add bus 24, tri-state drivers allow the multiple devices to share a single bus without sharing or contention conflicts. In other words, each tributary device drives the system bus 20 during its authorized timeslots only, and when it is not driving the system bus 20, it drives the system bus 20 to tri-state so that other tributary devices can put data onto the system bus 20.

In an alternate embodiment, the tributary devices are connected in a daisy-chain fashion, such that only a primary tributary device is connected between the system bus 20 and the master device 26. The other tributary devices are daisy chained to the primary tributary device. For example, suppose there are four tributary devices, and the last tributary device wants to add data to the system bus 20, the last tributary device would send its data to the third tributary device which would pass the data to the second tributary device which would pass the data to the primary tributary device which would add the data to the system bus 20. The third, second, and primary tributary devices simply act as "conduits" for the data during the timeslot(s) in which the fourth tributary device is authorized to add data.

Figure 2:
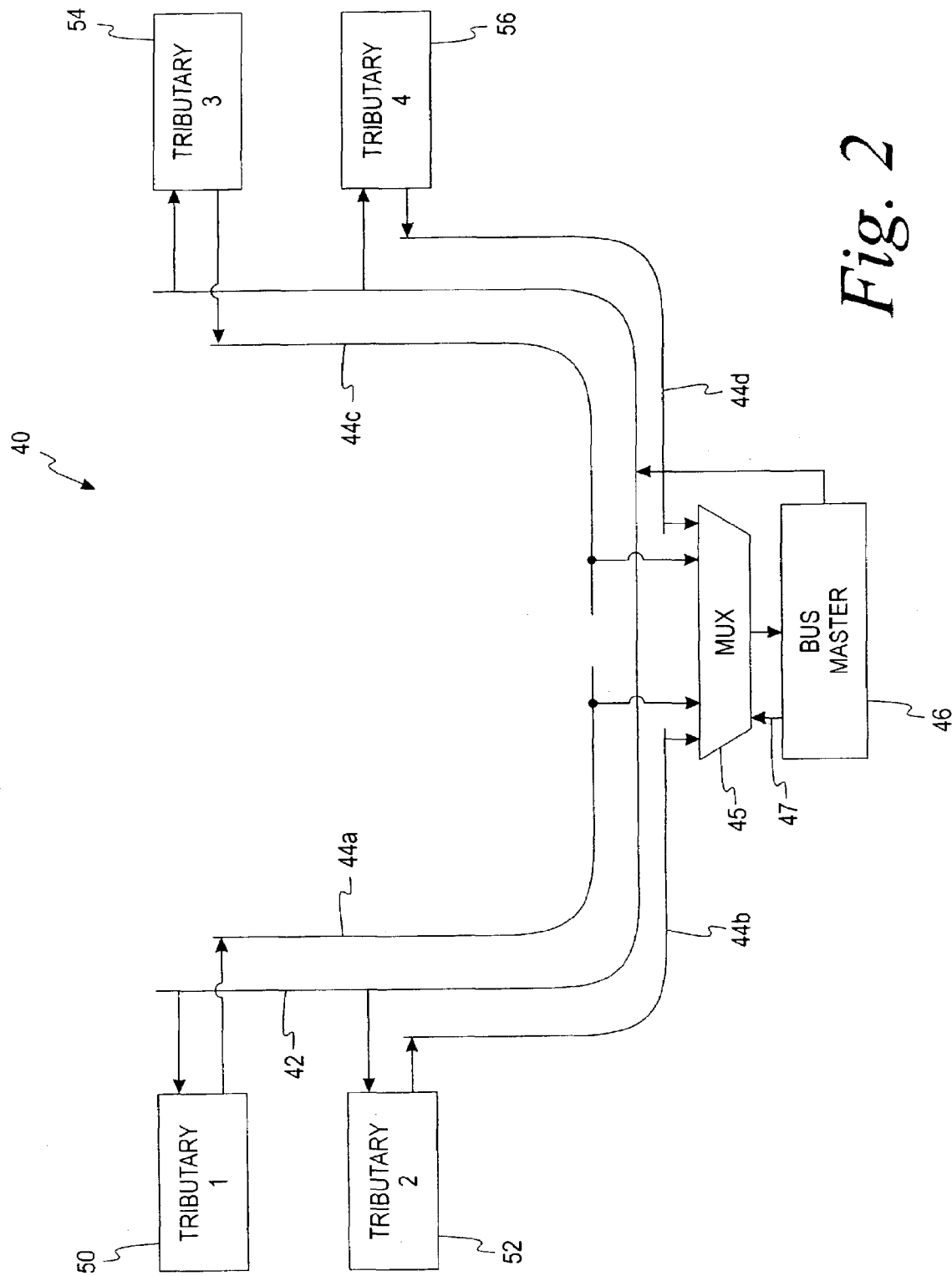
FIG. 2 is a functional block diagram of a system bus connected to tributaries each having its own add bus according to an embodiment of the present invention.

FIG. 2 shows a system bus 40 connected to tributary devices 50, 52, 54, 56, but unlike the system bus 20 shown in FIG. 1, the system bus 40 shown in FIG. 2 includes separate upstream or add busses 44a, 44b, 44c, 44d coupled to each tributary device 50, 52, 54, 56, respectively, rather than a single, shared add bus such as the add bus 24 of FIG. 1. Like the system bus 20, the system bus 40 includes a single, shared drop bus 42 coupled to a master device 46. The use of separate add busses 44a-d simplifies bus logic because non-transmitting tributary devices do not have to use tri-state bus drivers when not transmitting. Like the system bus 20 of FIG. 1, the system bus 40 also includes control signals and other signals for indicating to the tributary devices 50, 52, 54, 56 when each tributary device can map or de-map data relative to a standard protocol.

The master device 46 includes a conventional N:1 multiplexed data selector device 45 (e.g., a multiplexer) that has as inputs the add busses 44a, 44b, 44c, 44d (in FIG. 2, therefore, N=4). At least one control signal 47 is provided to the multiplexer 45, such as the IF_NUM control signal discussed below, to select one of the add busses. The multiplexer 45 outputs the contents of this add bus based on the control signal. This control signal is also provided to the tributary devices 50, 52, 54, 56, so that the address of that tributary device which has permission to put data on its corresponding add bus is the same address that the multiplexer 45 selects to present to the master device 46. The outputted data from the selected add bus is then further processed by the master device 46.

The system busses shown in FIGS. 1 and 2 have been described generally without reference to any specific protocol. In a preferred embodiment, the standard protocol is the well-known SONET/SDH protocol. Examples of SONET/SDH protocols include the "Synchronous Optical Network (SONET) Transport Systems: Common Generic Criteria," GR-253-CORE, Telcordia Technologies, and the "Node Network Interface for the Synchronous Digital Hierarchy (SDH)," G.707/Y.1322, ITU-T. Although SONET and SDH have minor variations, the embodiments of the present invention relating to SONET are equally applicable to SDH.

The SONET/SDH frame is sub-divided into blocks called Synchronous Transport Signal-level 1 (STS-1 in the case of SONET) or Synchronous Transport Module 0 (STM0 in the case of SDH). The STS-1 unit is used herein to refer also to STM0 in an SDH application. Likewise, other blocks such as virtual tributary (VT) blocks in the SONET architecture have SDH equivalents. These and other SONET and SDH equivalents are summarized in the table below. It is understood that when a particular SONET terminology, such as VT1.5, is employed in describing a particular embodiment, the corresponding SDH terminology or terminologies, such as TU-11, is equally applicable to the particular embodiment, and vice versa.

| SDH | SONET |
| --- | --- |
| Low Order (LO) containers | VT Payloads |
| C-11 | payload of VT1.5 (1.544 Mbs) |
| C-12 | payload of VT2 (2.048 Mbs) |
| none | payload of VT3 (3.152 Mbs) |
| C-2 | payload of VT6 (6.312 Mbs) |
| C3 | payload of 34 Mbs or 44 Mbs; C3 is LO if AU-4 multiplexing is used |
| High Order (HO) containers | STS Payloads |
| C3 | payload of 34 Mbs or 44 Mbs; C3 is HO if AU-3 multiplexing is used |
| C4 | payload of 139.264 Mbs |
| LO Virtual Containers | VT payloads + VT path overhead (VT SPE) |
| VC-11 | VT1.5 SPE |
| VC-12 | VT2 SPE |
| none | VT3 SPE |
| VC-2 | VT6 SPE |
| VC-3 | STS-1 SPE |
| HO Virtual Containers | STS payload + STS path overhead |
| VC-3 | STS-1 SPE |
| VC-4 | STS-3C SPE |
| Tributary Units | SPE + pointers |
| TU-11 | VT1.5 SPE + V1/V2/V3/V4 |
| TU-12 | VT2 SPE + V1/V2/V3/V4 |
| none | VT3 SPE + V1/V2/V3/V4 |
| TU-2 | VT6 SPE + V1/V2/V3/V4 |
| TU-3 | STS SPE + H1/H2/H3 |
| TU group 2 (TUG-2) | VT group (VTG) |
| TU group 3 (TUG-3) | none |
| Administrative Units | STS SPE + pointers |
| AU-3 | STS-1 SPE + H1/H2/H3 |
| AU-4 | STS3c SPE + H1/H2/H3 |
| AU group AUG | none |
| STM-1 | STS-3/STS-3c |
| STM-4 | STS-12 |
| STM-16 | STS-48 |
| STM-64 | STS-192 |
| STM-256 | STS-768 |
| two types of multiplexing (via AU-3 or AU-4) | one type of multiplexing |
| Cx to AU-3 to STM-N Cx to AU-4 to STM-N | payloads to STS-1 to STS-N |

In an embodiment, the master devices 26, 46 are SONET/SDH framer devices with section and line termination functionality, along with high- and low-order path termination capabilities. An STS/STM block is an example of a high-order signal. A VT/TU block is an example of a low-order signal. The master devices 26, 46 include a conventional network interface (not shown), and the data received by the master devices 26, 46 via the optical fiber is in the form of complete SONET/SDH frames.

Figure 3:
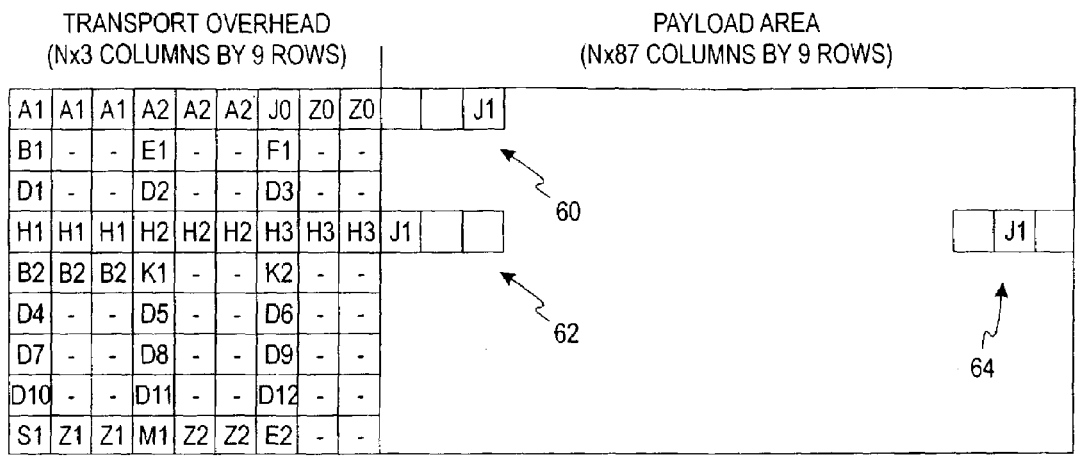
FIG. 3 is a table showing an OC-3 SONET frame and Transport Overhead octets.

FIG. 3 illustrates an example of an OC-3 frame (N=3) including transport overhead octets (or bytes) and payload octets. The master device 26, 46 frames the received SONET/SDH data using the A1 and A2 octets, and parses all of the transport overhead. In an embodiment, none of the transport overhead (TOH) is passed on to the system bus, i.e., the transport overhead octets are nulled. In such an embodiment, the master device 26, 46 must also determine the location of the synchronous payload envelope (SPE). The SPE is located using the H1 and H2 octets which contain a value between 0 and 782. This value corresponds to the relative location of the J1 octets within the SONET/SDH frame, and the J1 octet is the first octet of the SPE. Note that in an STS-N/STM-M there are N number of H1/H2 values which may have different values, so the N J1 octets will not necessarily occur in consecutive locations within each SONET/SDH frame. In FIG. 3, there are shown 3 H1/H2 values, the first 62 being set to value 0, the second 64 being set to value 86, and the third 60 being set to value 522.

Figure 4:
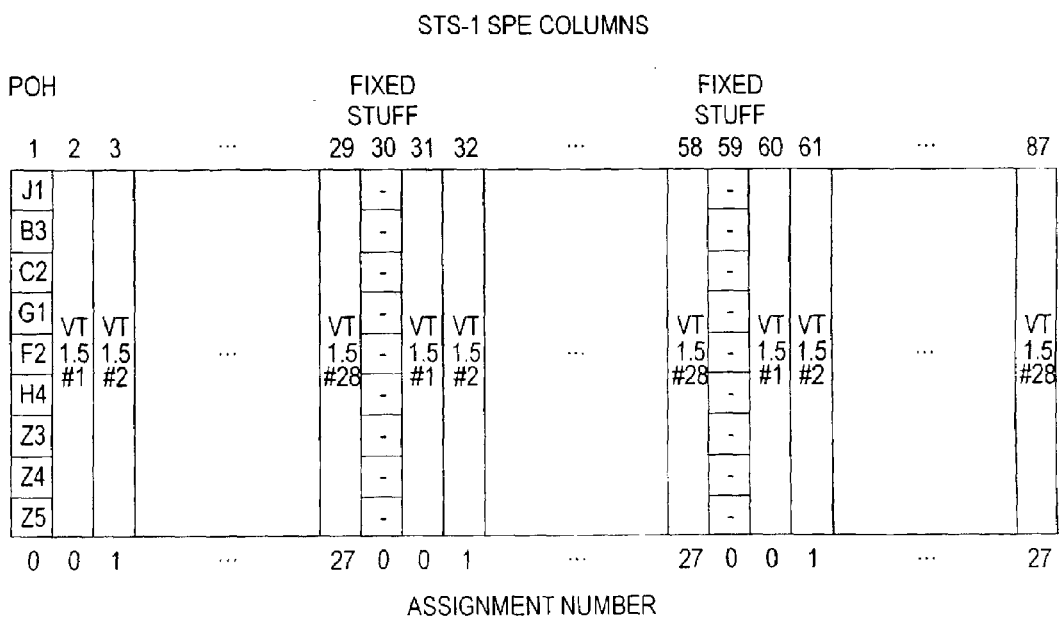
FIG. 4 is a table showing an SPE of an STS-1 containing VT1.5 blocks.

FIG. 4 is a table illustrating the SPE for a single STS-1 from a SONET/SDH frame with the transport overhead removed. The SPE is 87 columns by 9 rows, with 1 column of STS-1 path overhead (POH), 2 columns of fixed stuff, and 28×3 columns of payload. Note that the SPE "floats" inside the payload area of the SONET/SDH frame. Some tributaries require specific path overhead functions, such as H4-byte functions, so the entire POH is not nulled by the master device 26, 46 as is the transport overhead.

FIG. 4 also illustrates the assignment of columns to VT1.5s in the SPE. For example, the data contained in columns 3, 32, and 61 all belong to the same VT1.5. The assignment values shown at the bottom of the table of FIG. 4 are based on the predictability of where the data in the VT1.5 will be located within the SPE. The assignment values, which in the table range from 0 to 27, assign the particular column to a tributary in a configuration memory of the master device 26, 46.

A VT/TU-structured SPE contains 28 VT1.5/TU11s, or 21 VT2/TU12s. Each VT1.5/TU11/VT2/TU12 occupies the columns of 4 SONET/SDH frames. For example, a VT1.5 occupies 3 columns per SONET frame, across 4 SONET frames. Thus, each VT1.5 is 108 bytes in size, i.e., 3 (columns)×9 (rows)×4 (frames). A VT/TU consists of VT/TU path overhead and VT/TU payload. The VT/TU path overhead contains VT/TU pointers, similar to the H1/H2 SPE pointers and the VT/TU "floats" inside the VT/TU payload area. Because there are 28 VT1.5/TU11s or 21 VT2/TU12s per STS-1/AU-3/AU-4, there are 28 (in the case of VT1.5/TU11 mode) or 21 sets (in the case of VT2/TU12 mode) of VT/TU pointers.

In the add direction, the master device 26, 46 builds complete SONET/SDH frames, taking data provided by the tributaries 30-36 or 50-56 and adding path overhead and transport overhead. Fixed values are used for all payload pointers, but need not be. Tributaries are not able to insert transport overhead, however some tributaries require the ability to insert specific path overhead bytes, as explained in more detail below.

Generally speaking, the system bus of the present invention provides a flexible bus architecture for connecting traffic mapping devices to SONET/SDH framing devices. The system bus according to any embodiment described herein can be implemented on-chip, between different blocks, or off-chip, between separate devices. The system bus allows for any level of granularity in making such traffic connections, from VT1.5/TU11, up to any size of STS/STM concatenation. Both full duplex and half duplex connections are easily supported. These and other characteristics will be discussed next.

Figure 5:
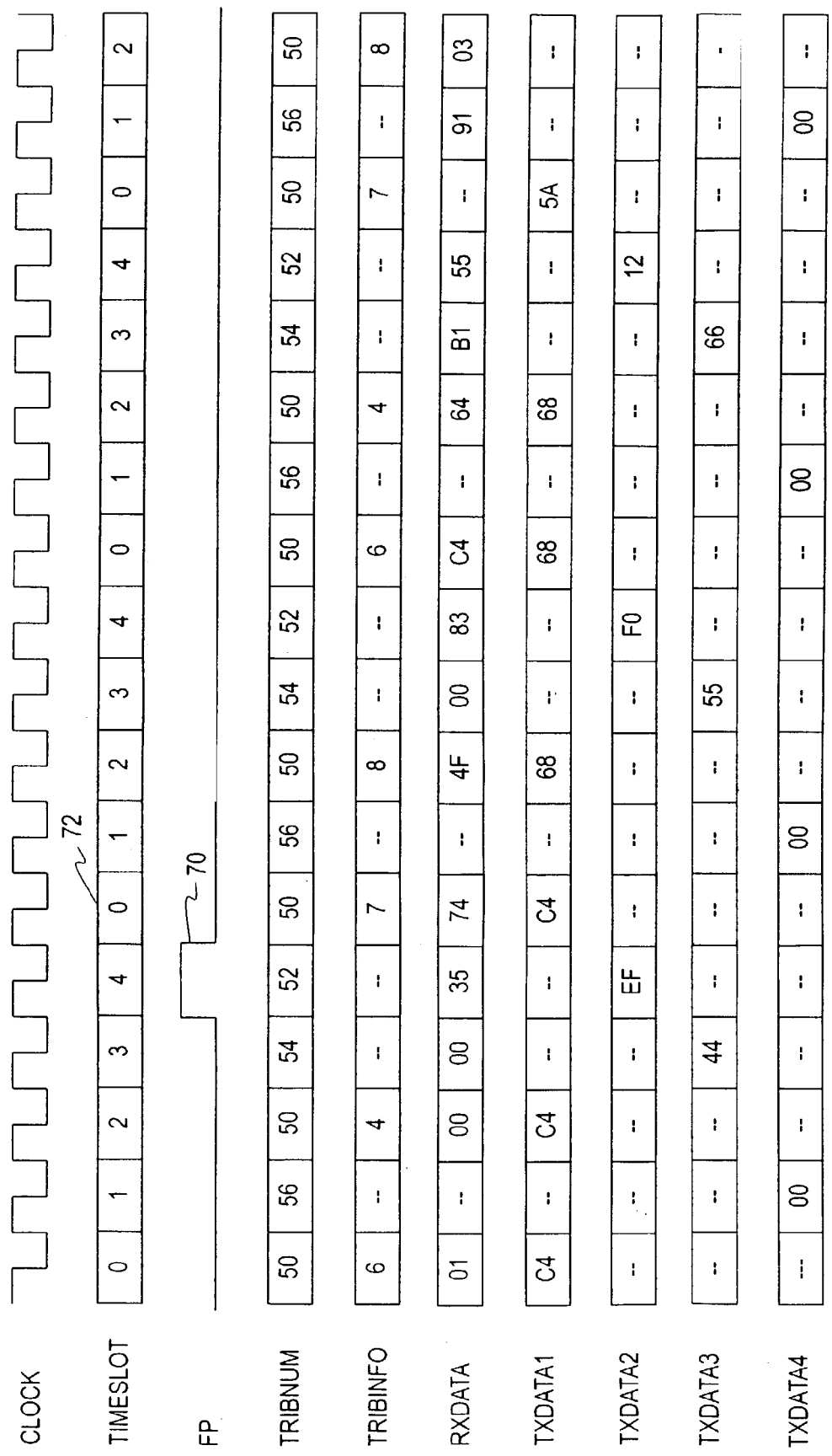
FIG. 5 is a timing diagram of the signals on a system bus according to a specific embodiment of the present invention.

FIG. 5 is a timing diagram of various signals on a system bus according to a specific embodiment of the present invention. The system bus may be the system bus 20, 40 shown and described in connection with FIGS. 1 and 2. The various signals are labeled in FIG. 5 as CLOCK, FP, TRIBNUM, TRIBINFO, RXDATA, TXDATA1, TXDATA2, TXDATA3, and TXDATA4. Note that the TIMESLOT indicator shown in FIG. 5 is shown for explanatory purposes only, and does not exist as an actual signal on the system bus 20, 40. Five timeslots are shown with one lane of drop data.

The master device 26, 46 provides the control signals shown in FIG. 5 to the system bus 20, 40. The control signals shown in FIG. 5 are the master bus CLOCK, a synchronizing pulse FP, a tributary address or value TRIBNUM and an optional tributary information TRIBINFO which may be used to identify a sub-tributary or port within a tributary device corresponding to the TRIBNUM value. The timing diagram illustrates a very specific and exemplary operation of the system bus 20, 40. Data on a downstream or drop bus, such as drop bus 22, 42 is shown in hexadecimal format as the signal RXDATA. Four exemplary add data signals, TXDATA1, TXDATA2, TXDATA3, and TXDATA4 are shown, labeled to correspond to four tributary devices 1, 2, 3, and 4. These data signals may represent data received by the master device 26, 46 from the tributary devices 30-36 or 50-56, respectively. The master device 20, 40 generates the control signals mentioned above and the RXDATA data signal. The tributary devices generate the TXDATA1-4 signals. The values shown in the TRIBNUM signal correspond to the reference numbers of the tributary devices 50-56 shown in FIG. 2.

Based on configuration and data requirements, the master device 20, 40 allocates timeslots in terms of byte transfers to each tributary device. Thus, in FIG. 5, tributary device 50 has been assigned to timeslots 0 and 2, tributary device 56 is assigned to timeslot 1, tributary device 54 is assigned to timeslot 3 and tributary device 52 is assigned to timeslot 4. These assignments and values are stored in the configuration memory of the master device 20, 40, and may be fixed or variable. The tributary devices do not need to monitor timeslots but instead monitor the TRIBNUM signal for their assigned value. Note that only one of the tributary devices, tributary device 50 has sub-tributaries or ports.

The tributary devices use the FP "heartbeat" signal for synchronization purposes, which broadcasts a pulse 70 on the system bus. Immediately following the pulse 70, all of the devices on the system bus are synchronized to TIMESLOT 72. In alternate embodiments, the FP signal can be generated once or at regular intervals as required for synchronization.

In an embodiment of the present invention, the control signal information for the add busses TXDATA1-4 precedes the actual expected data slot time by 25 octets. This delay allows the tributary devices 30-36 or 50-56 sufficient time to prepare their data for clocking onto their respective add bus TXDATA.

The system bus 20, 40 clocks one octet of data every CLOCK byte time for both the drop bus RXDATA and the add busses TXDATA1-4. A tributary's byte allocation can be broken up into multiple timeslots, as illustrated by the allocation of tributary device 50 to two timeslots, 0 and 3. Alternately, where multiple lanes are used, multiple tributaries may be assigned to the same timeslot. Since the tributary devices rely on the TRIBNUM and TRIBINFO signals it is the master device 20, 40 which allocates the TIMESLOTs to ensure synchronous bandwidth service.

Figure 6:
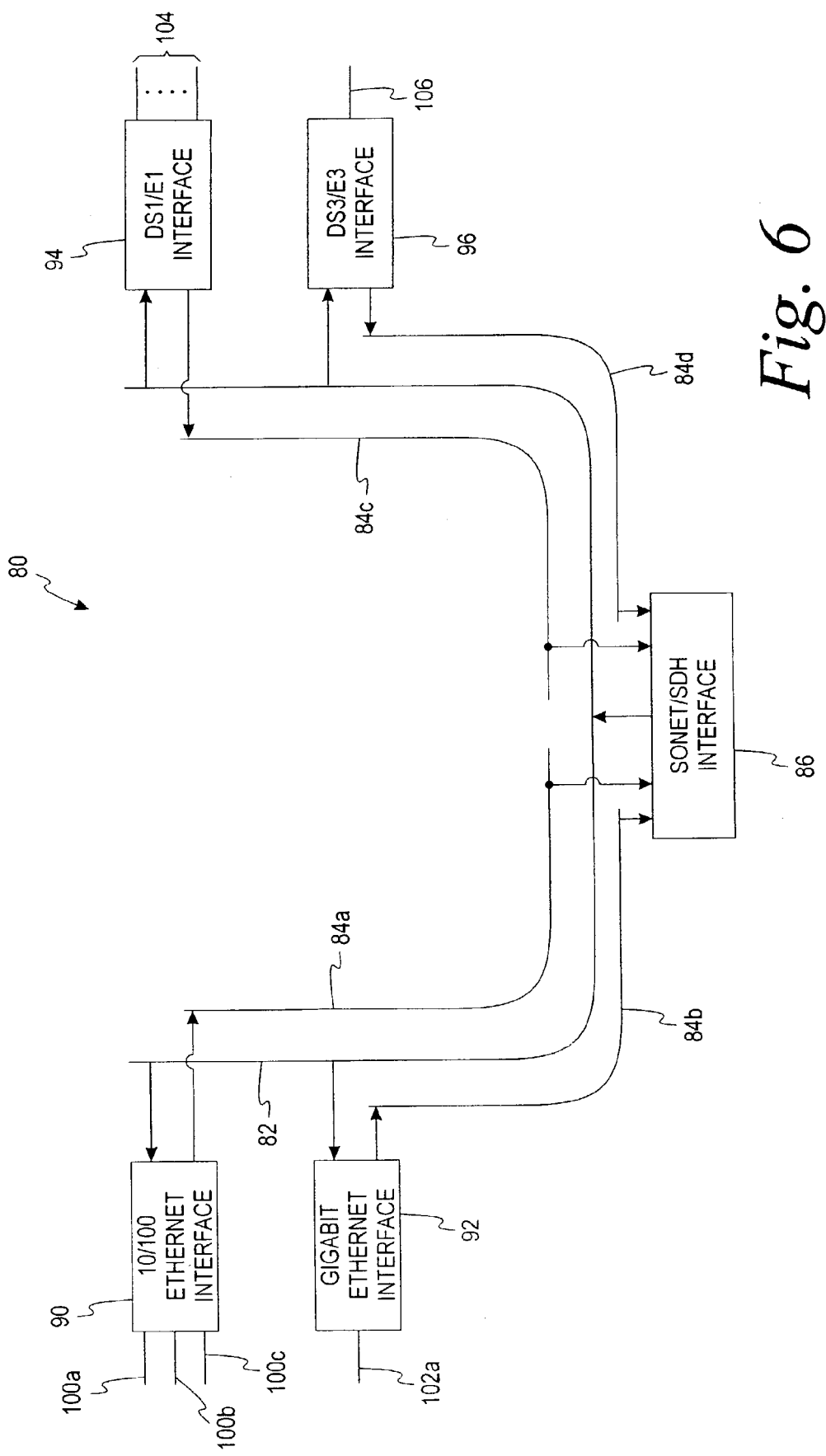
FIG. 6 is a functional block diagram of a system bus connected to specific tributaries each having its own add bus according to a specific embodiment of the present invention.
Figures 1, 6:
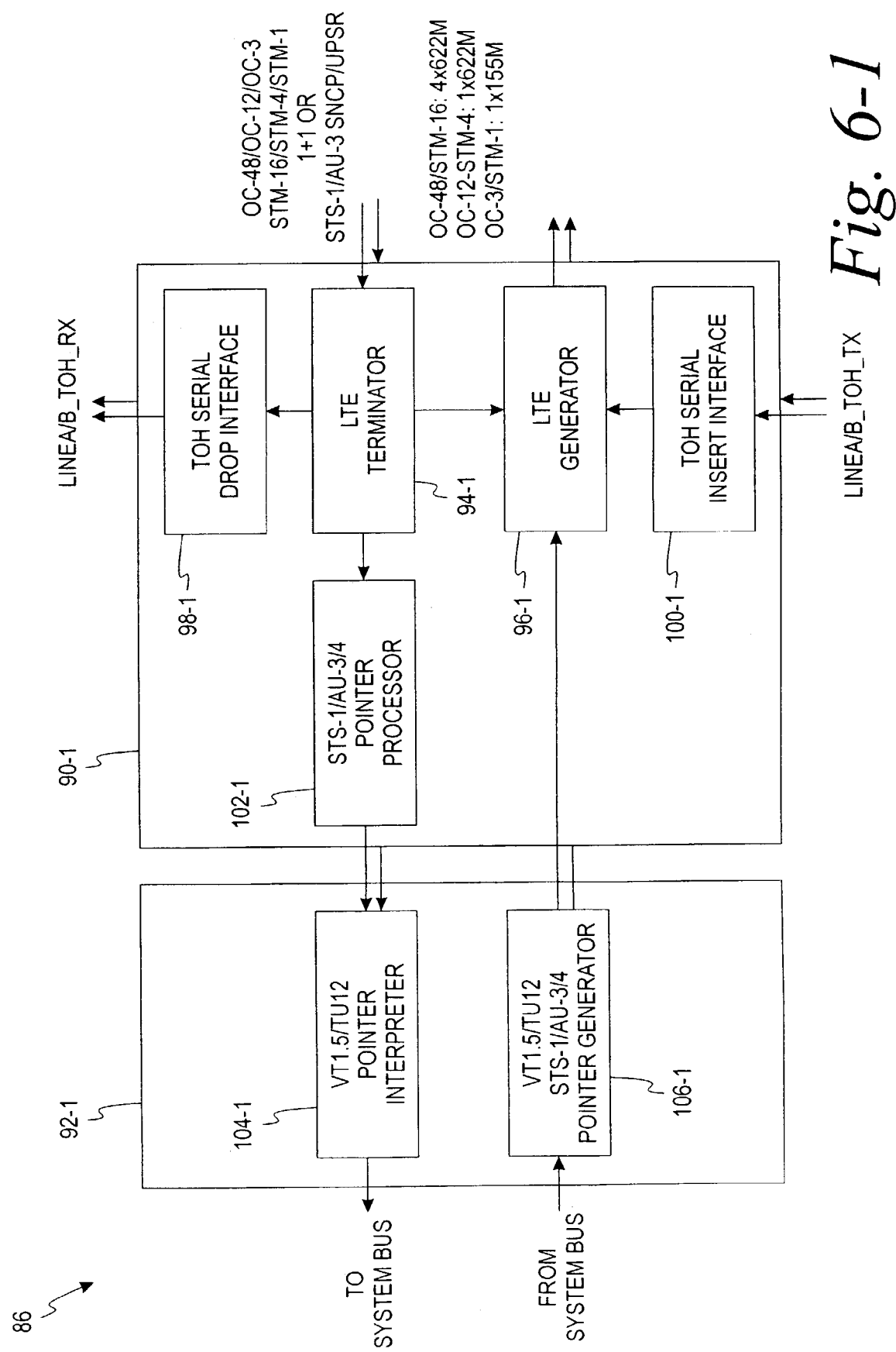

FIG. 6 is a functional block diagram of a system bus 80 connecting specific interfaces of tributary devices 90, 92, 94, 96 to a SONET/SDH interface 86. According to an embodiment of the present invention, the data on the system bus 80 is structured as a SONET/SDH frame and every byte time provides an octet from every STS-1 of the SONET frame. In FIG. 6, the SONET/SDH interface 86 performs SONET framing and pointer processing functions. Tributary device 90 includes a 10/100 Ethernet interface, tributary device 92 includes a Gigabit Ethernet interface, tributary device 94 includes a DS1/E1 interface 64, and tributary device 96 includes a DS3/E3 interface. These interfaces are provided by way example of only, are not meant to be an exhaustive list, and are not limited to SONET path termination functions. Any other conventionally known data protocols may be interfaced with the system bus of the present invention.

The SONET/SDH interface 86 also performs SONEFT/SDH framing and de-scrambling and may additionally perform STS/AU-4 path pointer processing, virtual tributary (VT) path pointer processing, and TUG-3 pointer processing. The optional pointer processing may be done on all of the data paths or on a subset thereof, depending on the requirements of the tributaries. The tributary devices 90-96 are mapper devices which support a SONET/SDH format. Examples of mapper devices include DS1/E1 mapper devices, Ethernet mapper devices, Generic Framing Procedure (GFP) mapper devices, and ATM mapper devices. The tributary devices 90-96 are responsible for the particular payload envelopes they require. For example, the DS1 mapper device 94 would be responsible for mapping DS1s into VT1.5s, but would not require any knowledge of STS-1 mapping or where in the STS-1 the VT1.5 resides.

In an embodiment, the drop bus 82 and the add busses 84*a,b,c,d* are 32 bit busses. The physical format of each bus comprises 32 separate wires (one for each bit) along with separate wires for each control signal, such as clock, the synchronization pulse, tributary selectors, and other data markers.

FIG. 6-1 is a functional block diagram of the master device 86 shown in FIG. 6 according to a specific embodiment of the present invention. The master device 86 is a dual SONET/SDH framer with STS/AU pointer processing and VT/TU pointer interpreting capabilities. In a specific embodiment, the master device 86 is an integrated circuit that generally includes a terminator block 90-1 and a pointer handling block 92-1. The terminator block 90-1 includes a Line Terminator Equipment (LTE) terminator 94-1 and an LTE generator 96-1 which are coupled to a TOH Serial Drop Interface 98-1 and a TOH Serial Insert Interface 100-1, respectively. The LTE terminator 94-1 is coupled to an STS pointer processor 102-1. The pointer handling block 92-1 includes a pointer interpreter 104-1 and a pointer generator 106-1.

With respect to downstream data handling, the LTE terminator 94-1 of the master device 86 receives SONET/SDH data and performs SONET/SDH framing and descrambling operations. The LTE terminator 94-1 operates to extract and monitor the line and section overhead (i.e., the transport overhead, or TOH) of the received SONET/SDH signal. Put another way, the LTE terminator 94-1 operates to find the A1 and A2 bytes and determine where the SONET/SDH frame begins. The SONET/SDH-framed payload data is then passed to the pointer processor 102-1. The pointer processor 102-1 time shifts the framed data so that the SONET/SDH frame is aligned with an internal sync clock (2K_FP) of the system bus 80. This time-shifting operation places the beginning of the SONET/SDH frame at the timeslot immediately following the 2K_FP pulse (such as the FP signal 70 in FIG. 5). The H1, H2 and H3 bytes of the TOH are then evaluated by the pointer processor 102-1 to determine the location of the J1 byte (which is where the SPE starts). Path overhead monitoring with respect to the H4 byte and other path overhead bytes is also performed by the pointer processor 102-1. At this point in the downstream data handling effort, all of the TOH values, and all of the POH values with the exception of the H4 byte, are no longer of concern or interest and, in a specific embodiment, are accordingly nulled out. Thus, what is output from the pointer processor 102-1 comprises a SONET/SDH frame with all byte locations present, but with those byte locations containing essentially only the non-overhead VT/STS SPE portion of the received SONET signal (i.e., a framed SPE payload). Put another way, while the TOH byte locations are present in the SONET/SDH frame, they merely serve as placeholders such that the overall timing of the SONET/SDH frame timing can be maintained, and, except for H4, for example, these byte locations do not contain any information. This framed SPE payload output is also referred to as a high (STS) order signal. To the extent VT signals are of importance and must be recovered, the output is passed on to the pointer interpreter 104-1 which monitors the virtual tributary (VT) pointers (V1 and V2) within the SPE to locate the beginning of the VT payload at the V5 byte. This VT payload is also presented as framed SPE payload output which is referred to as a low (VT) order signal. The master device 86 also generates the IF_NUM and IF_INFO signals which are provided to the tributaries to inform them when they can drop data relative to the drop bus 82.

With respect to upstream data handling, the pointer generator 106-1 signals the tributaries/ports with the IF_NUM and optionally IF_INFO signals (described below), in advance, as to when their VT/STS SPE payload data needs to be presented to the multiplexer (not shown, but is like the multiplexer 45 shown in FIG. 2). As discussed above, when the timing matches a certain tributary/port, the multiplexing function selects (or reads) the corresponding byte of payload data off the appropriate add bus 84*a,b,c,d*. The pointer generator 106-1 thus functions to populate the SONET/SDH frame with this selected payload data. In connection with populating the SPE of the SONET/SDH frame with the bytes of payload data provided by the tributaries and selected through the multiplexer of the add bus 84, the pointer generator 106-1 adds the VT pointers, specifies the POH bytes and further specifies the H1 and H2 bytes. Advantageously, since the SONET/SDH interface is building the SONET/SDH signal in essence from scratch as the originating entity, the H1/H2 pointers can be set to 522 thus placing the J1 byte next to the C1/Z0 byte and configuring a "clean" SONET/SDH frame. This framed data is then passed on to the LTE generator 96-1 wherein the appropriate SONET/SDH section and line (TOH) overhead information are added.

The master device 86 is additionally capable of performing a SONET/SDH signal pass-through operation. In an embodiment, the master device 86 is connected to two SONET/SDH input lines and two SONET/SDH output lines. Responsive to a loop-back request, the master device 86 can be configured to receive SONET/SDH signals on one of the input lines and pass those SONET signals back out of the integrated circuit chip through either or both of the SONET/SDH output lines. In performing this pass-through operation, however, the master device 86 does not possess the capability of performing any sort of space/time shifting of the included STS signals (for example, a signal received on STS-1, number 5 can only be sent out on STS-1, number 5).

Although the foregoing discussion in connection with FIG. 6-1 has focused on the details of the master device 86, it is understood that any master device according to any embodiment described herein may incorporate the details of the master device 86-1 and operate in similar fashion in alternate embodiments.

FIG. 7 is a table showing an exemplary assignment of timeslots to STS-1 blocks. There are four lanes of data each corresponding to twelve timeslots. For example, an STS-12 SONET frame consists of 12 STS-1s and can thus be represented by the first line of the table (lane 3) which shows the assignment of 12 STS-1 to the 12 consecutive timeslots 0-11. Clocking the system bus 80 at 77.76 MHz thus meets the STS-12 SONET timing requirements. Depending on the bus speed requirement and technology requirements, the system bus 80 can also use multiple lanes or data paths to transfer data. The assignment scheme illustrated in FIG. 7 shows that the system bus 80 includes 4 lanes, and when each of these lanes are operated at 77.76 MHz, the transfer rate required by STS-48 is satisfied. Every timeslot on a data lane represents the data belonging to a particular STS-1/AU-3/AU-4. The assignment of the timeslots and the STS-1 units is described in, for example, the GRE-253-CORE specification for SONET and the G.707 specification for SDH. For other applications of the system bus 80, the assignment of timeslot allocation can be determined by the requirements of the SONET/SDH interface 86.

Figure 8:
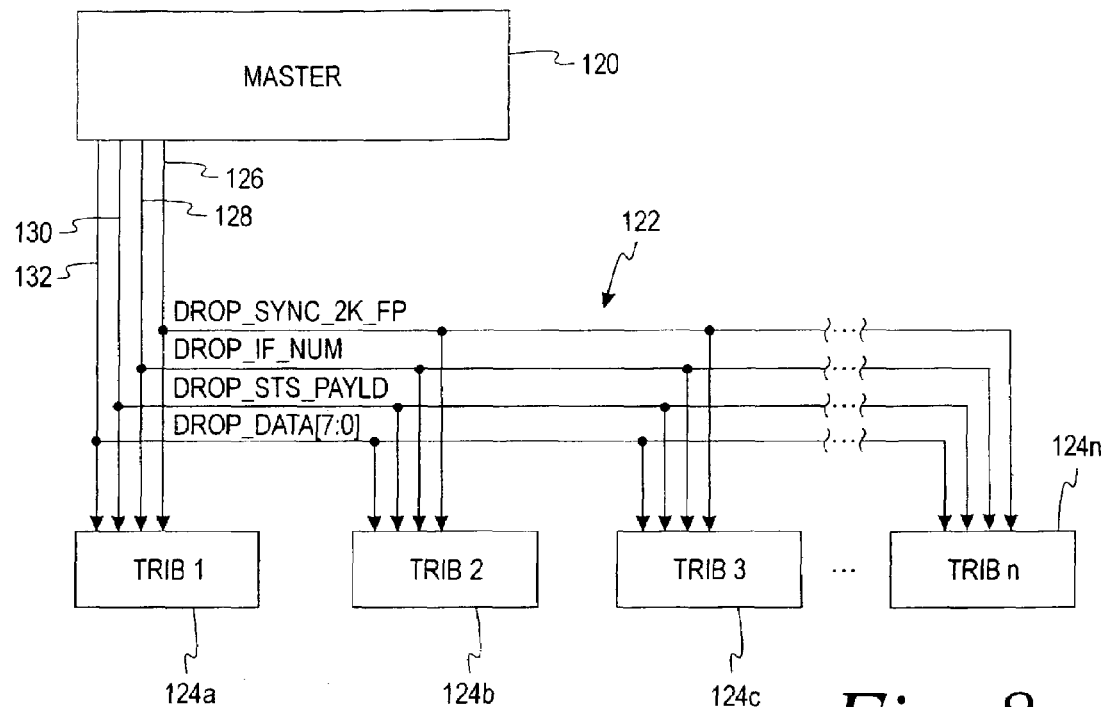
FIG. 8 is a functional block diagram of a system drop bus connected between a master and tributaries according to a specific embodiment of the present invention.
Figure 9:
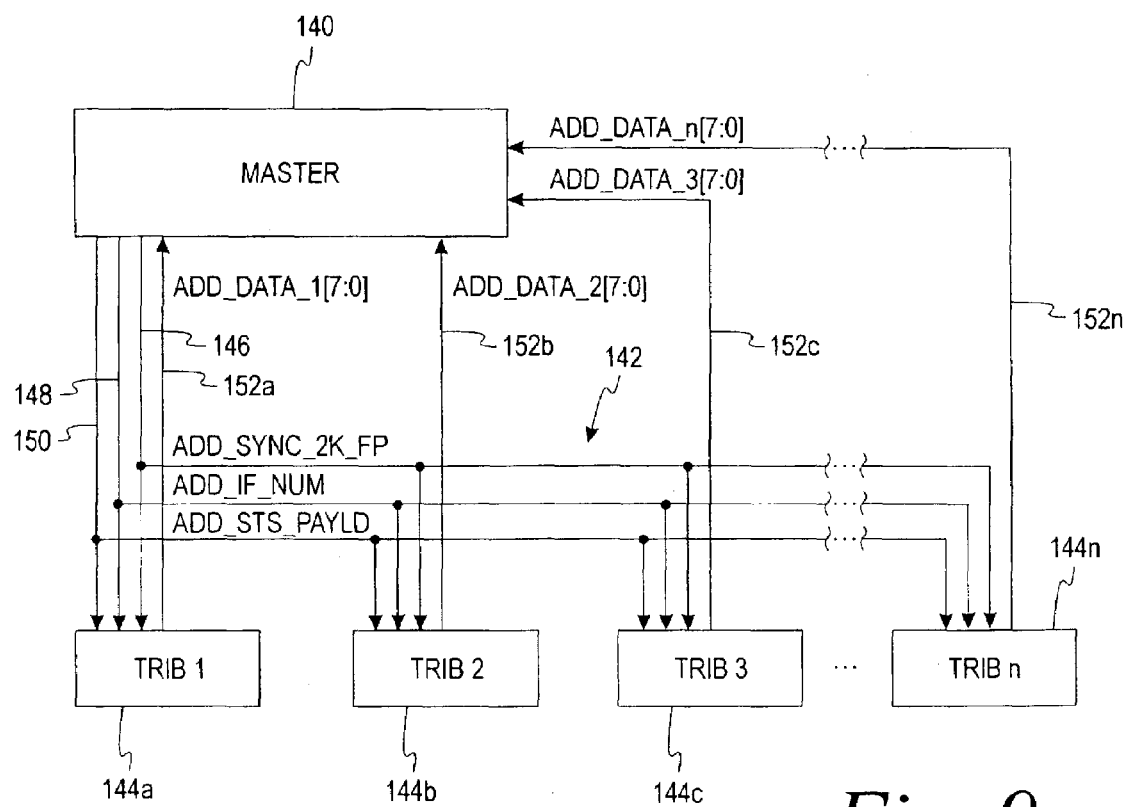
FIG. 9 is a functional block diagram of a system add bus connected between a master and tributaries according to a specific embodiment of the present invention.

FIG. 8 is a functional block diagram of the minimal architecture for a drop or downstream bus configuration according to a specific embodiment of the present invention. A master device 120 is connected to n number of tributary devices 124*a*, 124*b*, 124*c*, . . . 124*n* by a drop system bus 122. The following signals are shown in FIG. 8:

DROP_SYNC_2K_FP signal 126: This signal is pulsed for one clock cycle at least once or at regular intervals to synchronize all of the tributaries to a first timeslot and to provide the SONET/SDH frame and SONET/SDH multi-frame alignment. In a specific embodiment, this signal can be pulsed at a frequency of 2 kHz during the last timeslot and the last byte time of the SONET/SDH frame. The DROP_SYNC_2K_FP signal 126 may also synchronize the add bus(ses) or the add busses may have a separate add SYNC_2K_FP signal (such as shown in FIGS. 8 and 9).

DROP_IF_NUM signal 128: This signal indicates the value corresponding to the tributary to which the data in the corresponding lane belongs.

DROP_STS_PAYLD signal 130: This signal is asserted during the payload of an STS, but is not asserted during transport overhead, STS path overhead, or fixed stuff octets. In an embodiment, this signal is also asserted during the H3 byte time during a pointer decrement, if that byte does not contain STS path overhead or fixed stuff.

DROP_DATA[7:0] signal 132: This signal contains the data octets corresponding to the SPE portion of the SONET/SDH frame. This signal is broadcast to all of the tributaries 124*a, b, c, . . . n* connected to the drop system bus 122.

If there is more than one data lane, the signals DROP_IF_NUM, DROP_STS_PAYLD, and DROP_DATA[7:0] would be replicated for each lane. The DROP_SYNC_2K_FP signal is shared across the entire drop system bus 122. Additional control signals may be provided on the drop system bus 122 as detailed further below.

FIG. 9 is a functional block diagram of the minimal architecture of an add or upstream bus configuration according to a specific embodiment of the present invention. A master device 140 is connected to n number of tributary devices 144*a*, 144*b*, 144*c*, . . . 144*n* by an add system bus 142. The system bus 142 includes the following signals: an ADD_SYNC_2K_FP signal 146, an ADD_IF_NUM signal 148, an ADD_STS_PAYLD signal 150, an ADD_DATA_1 [7:0] 152*a* signal, an ADD_DATA_2[7:0] 152*b* signal, an ADD_DATA_3[7:0] 152*c* signal, and an ADD_DATA_n[7:0] 152*n* signal. The ADD_SYNC_2K_FP signal 146, ADD_IF_NUM signal 148, and ADD_STS_PAYLD signal 150 are functionally equivalent to the DROP_SYNC_2K_FP signal 126, the DROP_IF_NUM signal 128, and the DROP_STS_PAYLD signal 130, respectively, shown in FIG. 8. The add data signals 152*a, b, c, . . . n* carry data octets from the respective tributaries 144*a, b, c, . . . n*, and are physically separate busses from each other. Like the master device 46 shown in FIG. 2, the master device 140 includes a multiplexer which selects one of the n number of tributaries to be inserted into the SPE portion of a SONET/SDH frame. The ADD_IF_NUM signal 148 is provided to the multiplexer and operates to select the address of the tributary which is putting data onto its respective add bus. For example, when the ADD_IF_NUM signal 148 signals tributary device 144c that it can put data onto its corresponding add bus 152c, the ADD_IF_NUM signal 148 also informs the multiplexer in the master device 140 to select add bus 152c when the data is expected to arrive at the multiplexer, in an embodiment, 25 clock cycles after the tributary device 144c is signaled to put its data on add bus 152c. The data from tributary device 144c is then inserted into the SPE portion of the SONET/SDH frame that is being constructed by the master device 140 for transmission onto the optical fiber.

As mentioned above, the system bus may include additional low-order and high-order signals for an STS granularity tributary for both the add and drop bus configurations. Additional high-order signals (not shown) include:

IF_INFO signal: This signal carries a value corresponding to a sub-tributary or port of the tributary indicated in the IF_NUM signal. For example, a DS1 tributary block may support multiple DS1s.

STS_SPE signal: This signal indicates the data part of the STS SPE. This signal is not asserted during transport overhead, but unlike the STS_PAYLD signal, this signal is asserted during path overhead and fixed stuff.

J0_J1 signal: This signal is asserted during the J0 and J1 octets. This signal is interpreted with the STS_SPE signal to determine whether J0 or J1 is being indicated.

STS_AIS signal: This signal is asserted if the particular STS is receiving an Alarm Indication Signal (AIS), Loss of Pointer (LOP), unequipped condition, or payload mismatch (PLM) condition.

H4_PRESENT signal: This signal is asserted during the STS path overhead H4 byte time to indicate the presence of an H4 byte. This byte is used for virtual concatenation.

STS_STATE signal: This state indicates whether there is a non-consecutive change in an STS pointer, i.e., an H1/H2 pointer change other than an increment or decrement.

The following low-order signals (not shown) support a VT/TU granularity tributary, and may be added, in alternate embodiments, to the minimum set of signals set forth above and/or to the high-order signals just described:

V1_PRESENT signal: This signal is asserted during the VT path overhead V1 octet.

V5_PRESENT signal: This signal is asserted during the VT path overhead V5 octet.

VT_PAYLD signal: This signal is asserted during the VT/TU payload.

VT_AIS signal: This signal is asserted if the current VT is receiving an AIS or LOP condition, unequipped condition, or payload mismatch (PLM) condition.

J2_PRESENT signal: This signal is asserted during the VT path overhead J2 octet.

Z6_PRESENT signal: This signal is asserted during the VT path overhead Z6 octet.

Z7_PRESENT signal: This signal is asserted during the VT path overhead Z7 octet.

Z7_PHASE: This signal indicates which of the thirty-two Z7 bytes is presently on the system bus.

Z7_PHASE_VALID: This signal indicates that the Z7_PHASE signal is valid. In other words, this signal indicates to the tributaries that the value provided in the Z7_PHASE signal is trustworthy.

VT_STATE signal: This signal indicates whether there is a non-consecutive change in a VT pointer, i.e., a V1/V2 pointer change other than an increment or decrement.

Some of the signals above may be referred to herein as byte marker signals. Byte marker signals include the IF_NUM, STS_PAYLD, IF_INFO, STS_SPE, J0_J1, STS_AIS, H4, V1_PRESENT, V5_PRESENT, VT_PAYLD, VT_AIS, J2_PRESENT, Z6_PRESENT, Z7_PRESENT, Z7_PHASE, and Z7_PHASE_VALID signals.

Like the separate SYNC_2K_FP signals for the add and drop busses, there are also separate add and drop byte marker signals, ADD_STS_PAYLD and DROP_STS_PAYLD, for example. The drop signals generally indicate what is on the drop system bus 122 during that clock period, whereas the add signals generally indicate what the master device 140 expects on the add system bus 142, a pre-determined number of clock cycles later, to take into account the flip-flop switching delays. In a specific embodiment, the delay is 25 clock cycles. The SYNC_2K_FP and data byte marker signals (at a minimum, the IF_INFO and STS_PAYLD signals) provide all of the information a tributary requires for locating the overhead and payload bytes on the system bus.

The foregoing signals may be communicated over the system bus in at least any of the following four embodiments. In a first embodiment, the signals may be communicated in physically separate lines. The next embodiments are "pin-saving" embodiments because they do not require each signal to be communicated in physically separate lines. In a second embodiment, certain signals may be encoded. For example, the V5, J2, Z6, and Z7 octets appear in different locations within a SONET/SDH frame. Instead of communicating the signals which indicate the presence of each of these octets in four separate lines, two lines may be used to indicate a binary value corresponding to each of the octets (for example, binary value 0 may correspond to V5, binary value 1 may correspond to J2, and so forth). In a third embodiment, a byte counter signal is provided to indicate the position in the SONET/SDH frame for a given clock cycle. Thus, instead of indicating through separate signals the presence of V5, J2, Z6, or Z7 octets, the byte counter signal provides a value to the tributary indicating its position within the SONET/SDH frame for that clock cycle (such as column 75). In a fourth embodiment, the master device is provided characteristic information about the tributaries connected to it, and provides different encoded signals to each tributary based on its characteristic information. For example, the characteristic information may be that the tributary is a low-order or high-order device. For high-order devices, certain signals listed above are not needed (such as, for example, V1_PRESENT, V5_PRESENT, J2_PRESENT signals). Similarly, for high-order devices, certain of the above-listed signals are not needed (such as, for example, the J0_J1 and H4_PRESENT signals). While there may be a total of say, 20 signals, not all 20 of these signals need to be provided to every tributary. Thus, in this embodiment, a smaller set of signals are provided to the tributaries which carry different encoded information based on the characteristic information from the master device.

In addition to the four embodiments just described, still other embodiments include any combination of the four embodiments just described. Any of the pin-saving embodiments and any combination thereof may be applied to any system bus described herein.

The foregoing signals are not intended to represent an exhaustive list, and the present invention contemplates that additional signals can be generated by the master device to indicate the content or presence of any octet within the SONET/SDH frame. In alternate embodiments, none or some or all or additional ones of the foregoing signals are included with the system bus. It should be emphasized that in one embodiment, the entire SONET/SDH frame is not communicated across the system bus (i.e., the TOH is nulled), although it could be; the minimum set of signals set forth above which are provided to the tributaries obviate the need for the tributaries to perform any SONET/SDH reconstruction, full framing using the A1/A2 bytes, or pointer processing, thereby reducing hardware logic complexity in the tributary interfaces.

The master device 120, 140 includes a configuration memory (not shown) which is used to assign the correct data to a particular tributary. The configuration memory is synchronized with the SYNC_2K_FP signal. Again, there are separate add and drop configuration memories allowing for half-duplex and other non-full-duplex connections, if required. The configuration memory may be any conventional memory structure or structures and is organized as follows. Each lane of data has a separate configuration memory. Each of these memories has 32 entries for every timeslot. For example, in the OC-48 example of FIG. 7 (4 lanes, 12 timeslots,) there will be 4 add and 4 drop memories, each memory having 32×12=384 entries. Because a timeslot represents a particular STS-1, each group of 32 entries represents the 28 VT1.5/TU11s or 21 VT2/TU12s inside that STS-1/AU-3/AU-4. There are 4 unused entries in a SONET VT1.5 block, 11 unused entries in an SDH TU12 block. The content of the entry is a value indicating which tributary is assigned to that VT1.5/VT2/TU11/TU12.

Each assignment may be indicated by a major and minor value. In an embodiment where a tributary block supports multiple interfaces (i.e., a DS1 tributary block may support 28 DS1s), the major value indicates the major tributary type (i.e., VT, STS), while the minor value indicates the sub-tributary or port. These values are read out of the configuration memories, synchronized with the byte marker signals, and provided to the tributary blocks as the interface number (major value) and interface information (minor value). During non-payload byte times (e.g., during transport overhead and fixed stuff byte times), the interface number (IF_NUM) and interface information (IF_INFO) signals indicate the values for the next payload byte. For example, during transport overhead, the interface number indicates the value for the VT1.5/VT2/TU11/TU12 that resides in the 4th column of the SONET/SDH frame.

Therefore, in order to assign a particular VT1.5/VT2/TU11/TU12 to a specific tributary, the tributary's major and minor values are written to the configuration memory and address that corresponds to the correct VT1.5/VT2/TU11/TU12 within the appropriate STS-1/AU-3/AU-4. Assignment of paths larger than a VT1.5/VT2/TU11/TU12 is accomplished by writing the same value to the entire group of entries. For example, a DS3 tributary would be assigned a complete STS-1 by writing the same value to all 28 entries in the configuration memory corresponding to the particular STS-1. Larger, concatenated paths are handled in a similar way.

Minimally, a tributary needs only to be aware of the number of data lanes and its assigned major value. The tributary monitors IF_NUM and reacts only when it sees its assigned value on the system bus and the STS_PAYLD or VT_PAYLD signals are asserted. If the tributary supports multiple interfaces or sub-tributaries, the IF_INFO signal is used to assign the data byte to the correct interface or port.

In the add direction, some additional functionality is required. Because a tributary cannot provide data at the same time as the byte marker signals for that data is asserted, a number of clock periods are defined between when the byte marker signals indicate data is required and when that data is to be presented by the tributary block. Because different tributary blocks may require a different amount of time to provide the data, a worst-case number is chosen. Tributaries faster than the delay simply wait until the predefined number of clock periods, such as 25, have elapsed.

Since a master device according to the present invention terminates the high- and low-order paths, the master device can also provide REI (Remote Error Indication)/RDI (Remote Defect Indication) functionality. Because a path may not be full-duplex, a configuration bit in the add configuration memory indicates whether REI/RDI should be inserted. Similarly, AIS injection and error injection can be configured in the add configuration memory. Finally, some tributaries may require VT/TU or STS/STM path overhead insertion ability. This insertion can be handled by configuration bits, either in the add configuration memory or in a separate set of configuration registers (for STS-level control).

Figure 10:
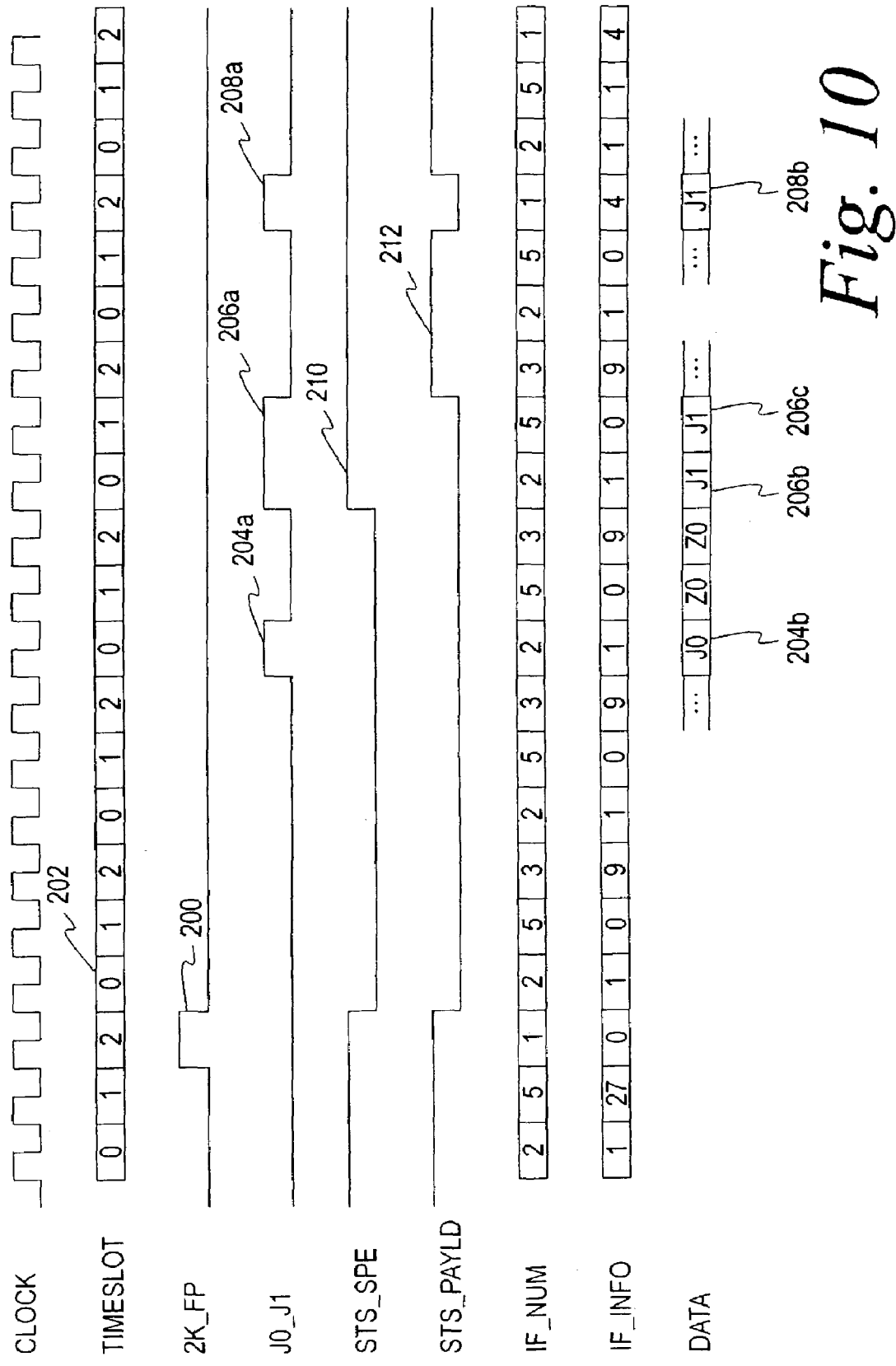
FIG. 10 is an exemplary timing diagram of certain signals of a system bus according to a specific embodiment of the present invention.

FIG. 10 is an exemplary timing diagram of certain signals of a system bus, such as the system bus 40 shown in FIG. 1. As mentioned above, in order to provide timeslot, SONET/SDH frame and multi-frame alignment, a 2 kHz frame pulse signal 200, 2K_FP, is generated by the master device 46 and is asserted for one clock cycle during the last timeslot and the last byte time of the SONET/SDH frame. Following the pulse, the tributaries 50-56 are synchronized to timeslot 202. In an embodiment, there are separate add and drop 2K-FP signals, because the add and drop busses 42, 44 are independent, though only one is shown in FIG. 10 for clarity. The master device 46 also provides signals indicating the content of the system bus 40, depending on the level of pointer processing required. There are separate sets of signals for each lane of data.

The timing diagram of FIG. 10 is an example of a portion of a drop bus timing for an STS-3 with 4 different tributary blocks (corresponding to values 1, 2, 3, and 5 shown in the IF_NUM signal) and one data lane (DATA) with three timeslots. In is another embodiment, the STS-3 is divided into 3 data lanes with one timeslot. Again, the TIMESLOT indicator is not an actual signal, but rather is provided for ease of discussion. The signals shown include CLOCK, 2K_FP, J0_J1, STS_SPE, STS_PAYLD, IF_NUM, IF_INFO, and DATA.

The 2K_FP pulse 200 occurs during the last byte of the STS-3 frame. On the next byte corresponding to timeslot 202, the STS_SPE and STS-PAYLD signals are de-asserted at beginning of transport overhead (recall that in one embodiment, the octets of the transport overhead are nulled). The J0_J1 signal is asserted for the J0 byte time 204*a*, and then again to indicate the presence of three J1 bytes 206*a*, 208*a* (corresponding to the three timeslots) in the SONET/SDH frame. Note that the first two STS-1s have their H1/H2 pointers set to 522, while the third STS-1 has its H1/H2 pointer set to 523. Note that in one embodiment, the J0 and Z0 bytes 204*b* shown in the timing diagram are not actually transmitted in the DATA signal because these bytes have been nulled out by the master device. They are shown for clarity purposes to indicate that when the J0_J1 signal is asserted, what byte information is being indicated by that assertion. The J1 bytes 206*b*, 206*c*, and 208*b* are shown to be present in the DATA signal, but need not be.

In timeslot 202, the IF_NUM signal informs tributary #2 that it should take all of the octets belonging to the first STS-1 block, and direct them to sub-tributary #1 of tributary #2. An example of tributary #2 is a DS3 tributary block. In timeslot 1 following timeslot 202, the second STS-1 block is assigned to tributary block #5 (this assignment is stored in the drop configuration memory), but each of the VT1.5s are assigned to different sub-tributaries. An example of tributary block #5 is a DS1 tributary block that can handle 28 different DS1s. The third STS-1 block has some VT1.5s assigned to tributary block #1 and others to tributary block #3.

Figure 11:
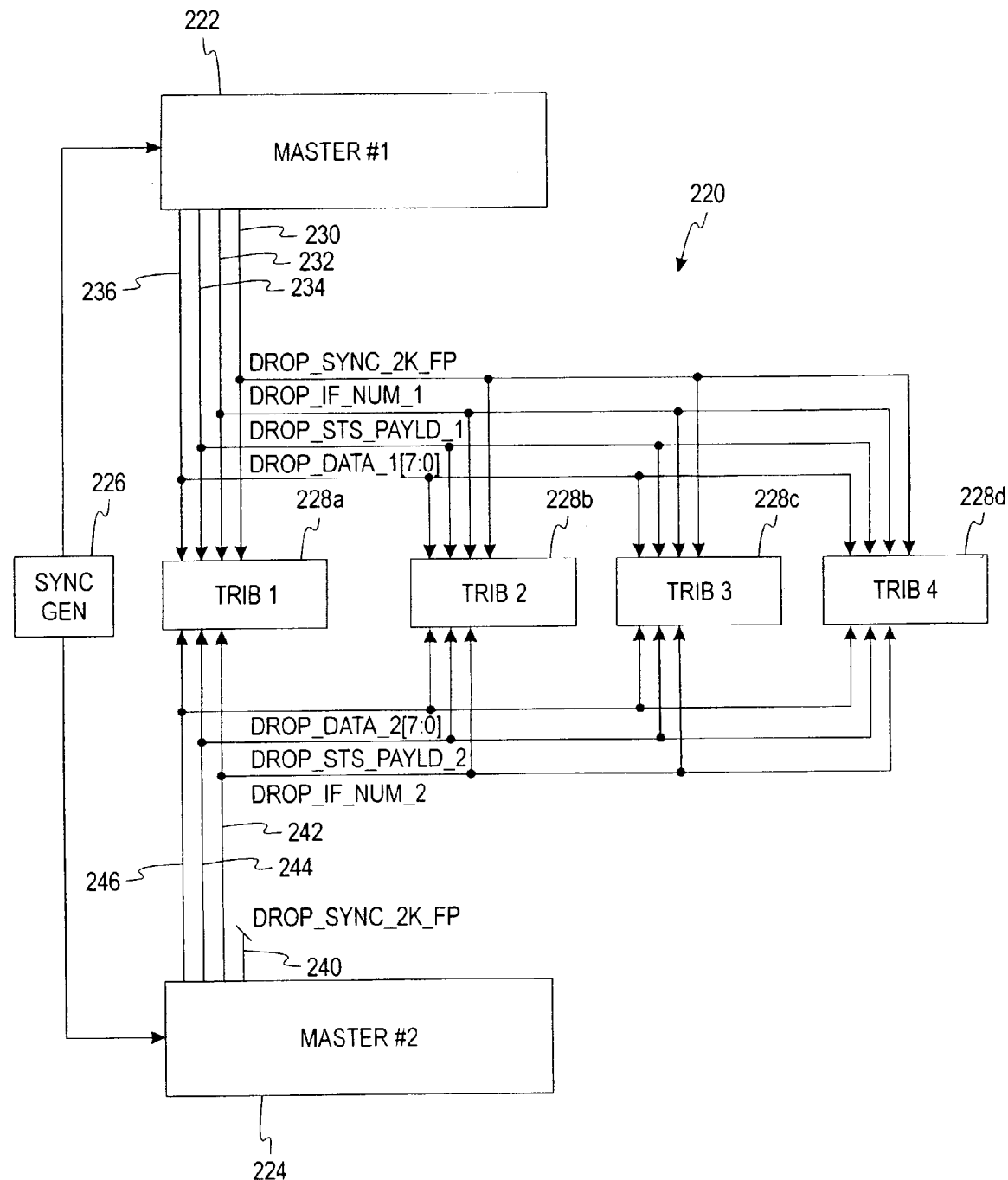
FIG. 11 is a functional block diagram of a system bus connecting two masters to tributaries according to a specific embodiment of the present invention.

FIG. 11 is a functional block diagram of a drop system bus 220 in a multi-master configuration. A first master device 222 and a second master device 224 are coupled to tributary devices 228a, b, c, d via the drop system bus 220. In this multi-master configuration, each of the master devices 222, 224 must be synchronized such that they output the same 2 kHz synchronization pulse signals. A synchronizer generator 226 ensures that the master devices 222, 224 are synchronized together. Accordingly, only one DROP_SYNC_2K_FP signal 230 is necessary and the DROP_SYNC_2K_FP signal 240 does not need to be connected to the tributaries 228. Each master device 222, 224 controls its own one or more lanes of data and is responsible for its own set of signals. The first master device 222 controls the DROP_SYNC-2K_FP signal 230, a DROP_IF_NUM_1 signal 232, a DROP_STS_PAYLD_1 signal 234, and a DROP_DATA_[7:0] signal 236. The second master device 224 controls a DROP_IF_NUM_2 signal 242, a DROP_STS_PAYLD_2 signal 244, and a DROP_DATA_2[7:0] signal 246.

As mentioned above, the system bus according to any embodiment of the present invention may, in alternate embodiments, be implemented in an integrated circuit chip, between different blocks, or off-chip, between separate devices. In the latter case, the system bus signals are brought to the pins of the integrated circuit device and may be connected with pins of other integrated circuit devices carrying a system bus according to the present invention.

In another embodiment, multiple systems having a system bus according to the present invention are concatenated together to achieve a parallel-processing capability and to handle more bandwidth. For example, to process and route traffic between an OC-192 line and numerous tributaries, four integrated circuit devices supporting 48 STS-1s can be concatenated together to support 192 STS-1s. Alternately, a single integrated circuit device supporting 192 STS-1s may be employed. The system bus of the present invention is fully scalable, supporting any SONET/SDH line rate, any size of concatenation, and any level of granularity in making traffic connections as mentioned before.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A synchronous system bus, comprising:
a clock signal defining at least one timeslot;
an interface address signal generated by a bus master coupled to said synchronous system bus, carrying with each timeslot a value corresponding to a tributary coupled to said synchronous system bus;
a data signal adapted to carry payload data synchronized with said clock signal; and
a payload marker signal generated by said bus master, indicating during which clock cycles of said clock signal payload data can be added to or dropped from said data signal.

2. The system bus of claim 1, further comprising an interface information signal generated by said bus master, carrying with each timeslot a value corresponding to a sub-tributary of the corresponding tributary value in the interface address signal.

3. The system bus of claim 2, wherein said sub-tributary corresponds to a port of an interface.

4. The system bus of claim 1, further comprising a synchronization signal pulsing at least once to synchronize tributaries connected to said system bus to a reference timeslot.

5. The system bus of claim 4, wherein said synchronization signal is clocked by a synchronization clock having a frequency of about 2 kHz.

6. The system bus of claim 1, wherein said clock signal has a frequency of about 77.76 MHz.

7. The system bus of claim 1, further comprising a trace signal generated by said bus master, indicating at least the start of said payload data in said data signal.

8. The system bus of claim 7, wherein said trace signal indicates the presence of at least a J0 byte or a J1 byte or a V5 byte of a SONET/SDH frame.

9. The system bus of claim 1, further comprising a pointer-change signal generated by said bus master, indicating at least a non-consecutive change in the value of an STS pointer.

10. The system bus of claim 1, further comprising a defect-present signal indicating the presence of at least an alarm indication signal (AIS), a loss of pointer (LOP), an unequipped condition, or a payload mismatch (PLM) condition.

11. The system bus of claim 1, wherein said payload data corresponds to at least the payload capacity portion of a synchronous payload envelope (SPE) portion of a SONET/SDH frame.

12. The system bus of claim 11, wherein said SPE is an STS/AU-4 SPE.

13. The system bus of claim 11, further comprising a VT-payload pointer signal generated by said bus master, indicating the presence of at least a V1 byte in the VT overhead of a VT superframe of said SPE portion of said SONET/SDH frame.

14. The system bus of claim 11, further comprising a VT-path overhead signal generated by said bus master, indicating the presence of at least a V5 byte in the VT path overhead of a VT superframe of said SPE portion of said SONET/SDH frame.

15. The system bus of claim 11, further comprising a VT-payload marker signal generated by said bus master, indicating the presence of at least a VT/TU payload of a VT superframe of said SPE portion of said SONET/SDH frame.

16. The system bus of claim 11, further comprising a VT-defect present signal generated by said bus master, indicating the presence of at least an alarm indication signal (AIS), a loss of pointer (LOP) condition, an unequipped condition, or a payload mismatch (PLM) condition.

17. The system bus of claim 11, further comprising a VT-path trace signal generated by said bus master, indicating the presence of at least a J2 byte in the VT path overhead of a VT superframe of said SPE portion of said SONET/SDH frame.

18. The system bus of claim 11, further comprising a VT-path growth signal generated by said bus master, indicating the presence of at least a Z6 byte or a Z7 byte in the VT path overhead of a VT superframe of said SPE portion of said SONET/SDH frame.

19. The system bus of claim 18, further comprising a Z7-valid signal generated by said bus master, indicating at least the validity of said Z7-value signal.

20. The system bus of claim 11, further comprising a VT-pointer change signal generated by said bus master, indicating at least a non-consecutive change in the value of a VT pointer of said SONET/SDH frame.

21. The system bus of claim 11, wherein said data signal is adapted to carry payload overhead bytes and fixed stuff bytes of said SONET/SDH frame.

22. The system bus of claim 11, wherein the transport overhead portion of said SONET/SDH frame is nulled.

23. The system bus of claim 11, wherein said payload data has a capacity of at least VT1.5.

24. The system bus of claim 11, wherein said payload data has a capacity of at least TU11.

25. The system bus of claim 11, wherein said payload data has a capacity of at least VT1.5/TU11 to at least STS-192/STM-64.

26. The system bus of claim 11, further comprising an SPE-present signal generated by said bus master, indicating the presence of an STS/STM synchronous payload envelope (SPE) in said SONET/SDH frame.

27. The system bus of claim 11, further comprising an overhead marker signal generated by said bus master, indicating the presence of at least one byte in an overhead portion of said SONET/SDH frame.

28. The system bus of claim 27, wherein said byte is one of J0, J1, H4, V1, V5, J2, Z6 and Z7.

29. The system bus of claim 11, further comprising a byte counter signal generated by said bus master, indicating for a clock cycle of said clock signal a position of an octet in said SONET/SDH frame relative to a reference timeslot.

30. The system bus of claim 1, wherein said tributary is a mapper device that supports a SONET/SDH mappable format.

31. The system bus of claim 30, wherein said SONET/SDH mappable format includes T1, T3, DS1/E1, DS3/E3, Ethernet, Generic Framing Procedure (GFP), and ATM.

32. The system bus of claim 30, wherein said mapper device includes one of an Ethernet interface, SPI interface, DS1/E1 interface, DS3/E3 interface, and telecommunications bus interface.

33. The system bus of claim 1, wherein said tributary is operable independent of the bandwidth of said payload data.

34. The system bus of claim 1, wherein each timeslot corresponds to an STS-1/AU-3/AU-4.

35. The system bus of claim 1, further comprising a second data signal adapted to carry payload data synchronized with said clock signal, said data signal representing a first lane, said second data signal representing a second lane, said first and second lanes each assigned to said at least one timeslot defined by said clock signal.

36. A system bus, comprising:
a drop bus including a clock signal, each cycle thereof defining at least one timeslot of a SONET/SDH frame,
a drop interface address signal generated by a bus master coupled to said system bus, carrying with each timeslot a value corresponding to one of a plurality of tributaries each coupled to said system bus,
a drop data signal adapted to carry payload data synchronized with said clock signal, said payload data corresponding to the SPE portion of said SONET/SDH frame, and
a drop payload marker signal generated by said bus master, indicating during which of said plurality of timeslots payload data can be dropped from said data signal; and
an add bus including an add interface address signal carrying with each timeslot a value corresponding to one of said plurality of tributaries,
a plurality of add data signals, one corresponding to each of said plurality of tributaries, and each adapted to carry payload data synchronized with said clock signal, said payload data corresponding to the SPE portion of said SONET/SDH frame, and
an add payload marker signal indicating during which of said plurality of timeslots payload data can be added to one of the plurality of add data signals corresponding to the tributary whose value is indicated by the add interface address signal.

37. The system bus of claim 36, wherein said drop bus further comprises a drop interface information signal generated by said bus master, said drop interface information signal carrying with each timeslot defined by said clock signal a value corresponding to a sub-tributary of the corresponding tributary value in the drop interface address signal and wherein said add bus further comprises an add interface information signal also generated by said bus master, said add interface information signal carrying with each timeslot defined by said clock signal a value corresponding to a sub-tributary of the corresponding tributary value in the add interface address signal.

38. The system bus of claim 36, wherein said drop bus further comprises a drop synchronization signal pulsing at predetermined intervals to synchronize devices connected to said system bus to a first timeslot defined by said clock signal and wherein said add bus further comprises an add synchronization signal pulsing at predetermined intervals to synchronize said devices connected to said system bus to a first timeslot defined by said clock signal.

39. The system bus of claim 36, wherein said drop bus further comprises a drop trace signal generated by said bus master, indicating the start of a payload on said drop data signal and wherein said add bus further comprises an add trace signal generated by said bus master, indicating the start of a payload on one of said plurality of add data signals.

40. The system bus of claim 36, wherein said drop data signal is provided to each of said plurality of tributaries.

41. The system bus of claim 36, wherein one of said drop bus and said add bus further includes a phase-indicator signal generated by said bus master, indicating the presence of an H4 byte of said SONET/SDH frame.

42. The system bus of claim 41, wherein one of said drop bus and said add bus further includes a phase-value signal generated by said bus master, indicating the value of said H4 byte.

43. The system bus of claim 42, further comprising a phase-valid signal generated by said bus master, indicating the validity of said phase-value signal.

44. The system bus of claim 36, wherein one of said drop bus and said add bus further includes a pointer-change signal generated by said bus master, indicating a non-consecutive change in the value of an STS pointer.

45. The system bus of claim 36, wherein one of said drop bus and said add bus further includes a defect-present signal generated by said bus master, indicating the presence of an alarm indication signal (AIS), a loss of pointer (LOP), an unequipped condition, or a payload mismatch (PLM) condition.

46. The system bus of claim 36, wherein one of said drop bus and said add bus further includes a VT-payload pointer signal generated by said bus master, indicating the presence of a V1 byte in the VT path overhead of a VT superframe of said SPE portion of said SONET/SDH frame.

47. The system bus of claim 36, wherein one of said drop bus and said add bus further includes a VT-path overhead signal generated by said bus master, indicating the presence of a V5 byte in the VT path overhead of a VT superframe of said SPE portion of said SONET/SDH frame.

48. The system bus of claim 36, wherein one of said drop bus and said add bus further includes a VT-payload marker signal aenerated by said bus master, indicating the presence of a VT/TU payload of a VT superframe of said SPE portion of said SONET/SDH frame.

49. The system bus of claim 36, wherein one of said drop bus and said add bus further includes a VT-defect present signal generated by said bus master, indicating the presence of an alarm indication signal (AIS), a loss of pointer (LOP) condition, an unequipped condition, or a payload mismatch (PLM) condition.

50. The system bus of claim 36, wherein one of said drop bus and said add bus further includes a VT-path trace signal generated by said bus master, indicating the presence of a J2 byte in the VT path overhead of a VT superframe of said SPE portion of said SONET/SDH frame.

51. The system bus of claim 36, wherein one of said drop bus and said add bus further includes a VT-path growth signal generated by said bus master, indicating the presence of a Z6 byte or a Z7 byte in the VT path overhead of a VT superframe of said SPE portion of said SONET/SDH frame.

52. The system bus of claim 36, wherein said drop bus further includes a VT-pointer change signal generated by said bus master, indicating a non-consecutive change in the value of a VT pointer of said SONET/SDH frame.

53. The system bus of claim 36, wherein said tributary is a mapper device that supports a SONET/SDH mappable format.

54. The system bus of claim 53, wherein said SONET/SDH mappable format includes T1, T3, DS1/E1, DS3/E3, Ethernet, Generic Framing Procedure (GFP), and ATM.

55. A system for mapping and de-mapping a plurality of high-order and low-order signals formatted according to different protocols into any timeslot of a SONET/SDH frame, comprising:
 a first master device including a memory storing a plurality of values corresponding to a plurality of slave interfaces;
 a clock line coupled to said first master device, said clock line generating a clock signal defining at least one timeslot; and
 a first bus operatively coupled between said first master device and said slave interfaces, said first bus including
  a first control line carrying for each timeslot a signal generated by said first master device indicative of one of said plurality of values stored in said memory,
  a first payload marker line carrying a signal generated by said first master device indicating the payload capacity portion of the synchronous payload envelope (SPE) portion of said SONET/SDH frame, and
  a first data line carrying data corresponding to the payload capacity portion of the synchronous payload envelope (SPE) portion of said SONET/SDH frame and the payload overhead bytes of said SONET/SDH frame.

56. The system of claim 55, further comprising:
 a second master device including a memory storing a plurality of values corresponding to a plurality of slave interfaces, said second master device coupled to said clock line; and
 a second bus operatively coupled between said second master device and said slave interfaces corresponding to said second master device, said second bus including a second control line carrying for each timeslot a signal generated by said second master device indicative of one of said plurality of values stored in said memory of said second master device,
  a second payload marker line carrying a signal generated by said second master device indicating the payload capacity portion of the synchronous payload envelope (SPE) portion of said SONET/SDH frame, and
  a second data line carrying data corresponding to the payload capacity portion of the synchronous payload envelope (SPE) portion of said SONET/SDH frame and the payload overhead bytes of said SONET/SDH frame.

57. The system of claim 55, said first bus further comprising a frame synchronization line carrying a signal adapted to synchronize said slave interfaces.

58. The system of claim 55, wherein the transport overhead bytes of said SONET/SDH frame are nulled.

59. The system of claim 55, wherein said memory includes 32 entries for each timeslot, each timeslot representing an STS-1/AU-3/AU-4.

60. The system of claim 59, wherein each timeslot represents 28 VT1.5/TU11 blocks or 21 VT2/TU12 blocks.

61. The system of claim 55, wherein said memory includes a value indicating insertion or non-insertion of REI/RDI bits of said SONET/SDH frame.

62. A method of communicating signals across a system bus, comprising:
 defining at least one timeslot with a clock signal on a system bus;
 assigning in a bus master said at least one timeslot to a value corresponding to a tributary;
 carrying payload data associated with said tributary over said system bus in synchronization with said clock signal; and
 signaling by said bus master during which clock cycles of said clock signal payload data can be added to or dropped from said data signal.

63. The method of claim 62, further comprising assigning said at least one timeslot to a value corresponding to a sub-tributary of said tributary.

64. The method of claim 62, further comprising synchronizing tributaries connected to said system bus to a reference timeslot.

65. The method of claim 62, further comprising signaling by said bus master the beginning of said payload data in a trace signal of said system bus.

66. The method of claim 62, wherein said payload data corresponds to the payload capacity portion of a synchronous payload envelope (SPE) portion of a SONET/SDH frame.

67. The method of claim 66, further comprising signaling by said bus master the presence of an H4 byte of a SONET/SDH frame.

68. The method of claim 66, further comprising signaling by said bus master the presence of one of a V1 byte, a V5, byte, a J2 byte, a Z6 byte, and a Z7 byte in the VT path overhead of a VT superframe of said SPE portion of said SONET/SDH frame.

69. The method of claim 66, further comprising signaling by said bus master the presence of VT/TU payload of a VT superframe of said SPE portion of said SONET/SDH frame.

70. The method of claim 66, wherein said payload data includes payload overhead bytes and fixed stuff bytes of said SONET/SDH frame.

71. The method of claim 66, wherein the transport overhead portion of said SONET/SDH frame is nulled.

72. The method of claim 66, wherein said tributary includes one of an Ethernet interface, an SPI interface, a DS1/E1 interface, a D3/E3 interface, and a telecommunications bus interface.

73. The method of claim 66, wherein said tributary supports a SONET/SDH mappable format including T1, T3, DS1/E1, DS3/E, Ethernet, Generic Framing Procedure (GFP), and ATM.

74. The method of claim 66, wherein said at least one timeslot corresponds to an STS-1/AU-3/AU-4.

75. A method of communicating high-order and low-order signals over a system bus synchronized to clock cycles of a clock, comprising:
synchronizing a plurality of tributaries to a first timeslot;
transmitting from a bus master on said system bus values each corresponding to unique ones of said plurality of tributaries in a predetermined order, one at a time, to each of said plurality of tributaries;
signaling from said bus master during which of said clock cycles data can be communicated over said system bus; and
communicating during at least one clock cycle data between said system bus and the tributary corresponding to the value provided on said system bus during said at least one clock cycle.

76. The method of claim 75, wherein said high-order signals are signals of the Synchronous Transport Signal (STS) type and said low-order signals are signals of the Virtual Tributary (VT) type.

77. The system of claim 75, wherein said high-order signals and said low-order signals are formatted according to at least two different protocols, including T1, T3, DS1/E1, DS3/E3, Ethernet, Generic Framing Procedure (GFP), and ATM.

78. The method of claim 75, wherein said low-order signals include signals of the VT1.5/TU11 type.

79. The method of claim 75, wherein said data includes payload data structured according to a SONET/SDH frame.

80. The method of claim 79, further comprising signaling from said bus master the presence of a J1 byte in said SONET/SDH frame on said system bus.

81. The method of claim 79, further comprising:
associating a set of second values to at least one of said values, said second values corresponding to ports of the tributary corresponding to said at least one of said values; and
transmitting from said bus master said second values on said system bus.

82. The method of claim 79, further comprising signaling from said bus master the presence of an STS-1/AU-4 synchronous payload envelope (SPE) in said SONET/SDH frame.

* * * * *

UNITED STATES PATENT AND TRADEMARK OFFICE
CERTIFICATE OF CORRECTION

| | | |
|---|---|---|
| PATENT NO. | : 7,305,014 B2 | Page 1 of 1 |
| APPLICATION NO. | : 10/421018 | |
| DATED | : December 4, 2007 | |
| INVENTOR(S) | : David Kirk et al. | |

It is certified that error appears in the above-identified patent and that said Letters Patent is hereby corrected as shown below:

In column 19, in Claim 48, please replace line 16 with the following:

-- signal generated by said bus master, indicating the presence --

Signed and Sealed this

Twenty-ninth Day of April, 2008

JON W. DUDAS
*Director of the United States Patent and Trademark Office*